(12) United States Patent
Brunner

(10) Patent No.: US 8,314,847 B2
(45) Date of Patent: *Nov. 20, 2012

(54) AUTOMATIC TONE MAPPING CURVE GENERATION BASED ON DYNAMICALLY STRETCHED IMAGE HISTOGRAM DISTRIBUTION

(75) Inventor: Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/786,712

(22) Filed: May 25, 2010

(65) Prior Publication Data

US 2011/0292246 A1     Dec. 1, 2011

(51) Int. Cl.
*H04N 5/228* (2006.01)
*H04N 5/76* (2006.01)

(52) U.S. Cl. .......... 348/222.1; 348/231.99; 348/E05.31; 382/167

(58) Field of Classification Search ............... 348/222.1, 348/254, E05.022, 231.99, E05.031
See application file for complete search history.

(56) References Cited

U.S. PATENT DOCUMENTS

| | | | |
|---|---|---|---|
| 6,417,698 B1 * | 7/2002 | Williams et al. | 326/93 |
| 7,023,580 B2 * | 4/2006 | Zhang et al. | 358/1.9 |
| 2005/0024522 A1 * | 2/2005 | Nakami et al. | 348/362 |
| 2007/0081721 A1 | 4/2007 | Xiao et al. | |
| 2007/0223813 A1 * | 9/2007 | Segall et al. | 382/166 |
| 2007/0268534 A1 | 11/2007 | Duan et al. | |
| 2008/0088858 A1 | 4/2008 | Marcu et al. | |
| 2008/0089580 A1 * | 4/2008 | Marcu | 382/162 |
| 2008/0199074 A1 | 8/2008 | Mitsunaga | |
| 2008/0253758 A1 | 10/2008 | Yap et al. | |
| 2008/0317358 A1 | 12/2008 | Bressan et al. | |
| 2009/0060367 A1 * | 3/2009 | Wei | 382/260 |
| 2009/0092340 A1 * | 4/2009 | Arguelles | 382/306 |
| 2009/0295705 A1 | 12/2009 | Chen et al. | |

* cited by examiner

*Primary Examiner* — Hung Lam
(74) *Attorney, Agent, or Firm* — Wong, Cabello, Lutsch, Rutherford & Brucculeri

(57) ABSTRACT

An apparatus, method, computer useable medium, and processor programmed to automatically generate tone mapping curves in a digital camera based on image metadata are described. Rather than having a static tone mapping curve for all images, the curve can be varied automatically based on, e.g., the brightness histogram of the image. In one embodiment, a certain percentage of the least bright pixels and a certain percentage of the brightest pixels can be disregarded, while the remaining pixels can be linearly stretched to encompass the original range of brightness values. Based on the distribution of the resultant stretched brightness histogram, slopes for the low end ($S_0$) and high end ($S_1$) of the tone mapping curve can be independently determined, and the tone mapping curve can be automatically generated. The improved, automatically generated tone mapping curve may be able to lift shadows more aggressively and/or increase the dynamic range of the image.

25 Claims, 13 Drawing Sheets

AUTOMATIC TONE MAPPING CURVE GENERATION BASED ON DYNAMICALLY STRETCHED IMAGE HISTOGRAM DISTRIBUTION

CROSS-REFERENCE TO RELATED APPLICATION

The present application is related to commonly-owned U.S. application Ser. No. 12/479,629, filed Jun. 5, 2009, and entitled, "Automatic Tone Mapping for Cameras" (hereinafter, "the '629 application"). The '629 application is hereby incorporated by reference in its entirety.

BACKGROUND

The digital image sensor, such as a charge-coupled device (CCD), of a digital camera has a plurality of photo-sites arranged in a colored filtered array or pattern, such as an RGB Bayer pattern. In the RGB Bayer pattern, each photo-site is filtered so that it is receptive to either: red, green, blue, or some variation thereof. The type of colored filter array and digital imaging sensor varies typically based on the manufacturer of the digital camera. For example, some color filtered arrays use a pattern of yellow, cyan, green, and magenta. Typically, the digital camera has an image pipeline that performs a demosaicing or de-Bayering process on the image, lens correction, and an RGB contrast and saturation boost. Finally, a noise reduction process may be performed, and the data may be encoded into the YCbCr family of color spaces or other format suitable for displaying and viewing.

Various considerations must be addressed when processing a digital image obtained with a personal electronic device, e.g., a digital camera, digital video camera, or other imaging device. One consideration involves preserving the spatial quality and the detail of the digital image, while another consideration involves sufficiently representing the color of the digital image. In many ways, these two considerations are interrelated.

A well-known technique used to render digital images more visually appealing is the use of tone-mapping curves. Tone mapping is a technique used in image processing and computer graphics to map one set of colors or image characteristics to another set of values, often to approximate the appearance of high dynamic range images in media with a more limited dynamic range. However, with conventional tone mapping techniques, one has to find a single tone curve that matches all possible scenes or has to get user input to select which tone curve is appropriate. Further, some conventional tone mapping techniques use symmetrical tone curves. These symmetrical tone curves boost (or decrease) two data points that are equidistant from a mean input value by the same amount, regardless of whether the data point represented a lower-than-mean value or a higher-than-mean value. Prior art boosting techniques such as those described above could result in visually unappealing photos in certain scenes or light levels.

SUMMARY

In some embodiments, the present invention can include a low computational cost, efficient tone mapping algorithm that automatically takes scene information into account. In some embodiments, the tone mapping algorithm can boost low brightness ranges and high brightness ranges of the image data independently from each other to create more visually appealing photos by utilizing the image's histogram metadata.

By examining an image's metadata, e.g., the image's brightness histogram metadata, one can get a good sense of the distribution of pixel brightness values within the image. Once the brightness histogram of the current image frame has been calculated, the color range of the image may be dynamically adjusted. The tone mapping curve can then be generated appropriately for subsequent frames based on the current frame's adjusted brightness histogram. One advantage of this technique is that the histogram computation as well as the tone mapping may be done in the digital camera sensor's processor itself, and then the image frame information may be streamed to memory, making this a low-cost computation for the personal electronic device. Alternatively, the automatic tone mapping method described below may be implemented in other hardware within the personal electronic device possessing the digital camera. To further increase efficiency, brightness information from the current image frame can be used to determine the tone curve for the next or subsequent image frames.

Because the exposure parameters in a typical digital camera or digital video camera are designed to change gradually, the tone curves can be changed gradually as well, producing no visually jarring changes for the user when the camera enters a different lighting condition. In one embodiment, to achieve this gradual changing of the tone curve, the tone curve may be updated at a rate commensurate with the rate of change of the distribution of the image histogram metadata. For example, if the image histogram is changing smoothly, e.g., due to a user slowly panning camera, then the corresponding tone curve can change smoothly as well. However, the histogram can change substantially from one frame to the next frame, e.g., due to a car driving through a scene, and, to avoid sudden visible changes in the tone curves, the changing of the tone curve's parameters, e.g., the slopes of the tone mapping curve at the low end and high end of the curve, may have additional dampening applied, thus making the tone curve changes appear gradual—even if the image's histogram is changing rapidly.

Further, independently varying the slopes of the tone mapping curve at the low end and high end of the curve can result in more visually appealing images. In one embodiment, by utilizing a non-symmetric curve for the tone mapping curve, it is possible to fix the tone mapping curve at two endpoints, say (0,0) and (1,1), and independently vary the slope at the (0,0) point, $S_0$, and the slope at the (1,1) point, $S_1$, by modifying various parameters of the tone mapping curve. By dynamically and independently selecting $S_0$ and $S_1$ slope values based at least in part on image metadata, more visually pleasing images can be generated.

In some embodiments, the values of $S_0$ and $S_1$ may be based at least in part on the distribution of the image's brightness histogram or color histogram(s). For example, according to one embodiment described herein, a certain percentage of the least bright pixels in the image and a certain percentage of the brightest pixels in the image can be disregarded, while the remaining pixels can be linearly stretched to encompass the original range of brightness values for the image. Based on the distribution of the resultant stretched image brightness histogram, slopes for the low end ($S_0$) and high end ($S_1$) of the tone mapping curve can be independently determined, and the tone mapping curve can be automatically generated based thereupon. The improved, automatically generated tone mapping curve may be able to lift shadows more aggressively and/or increase the dynamic range of the image by utilizing the image's histogram metadata.

DETAILED DESCRIPTION

Figure 1:
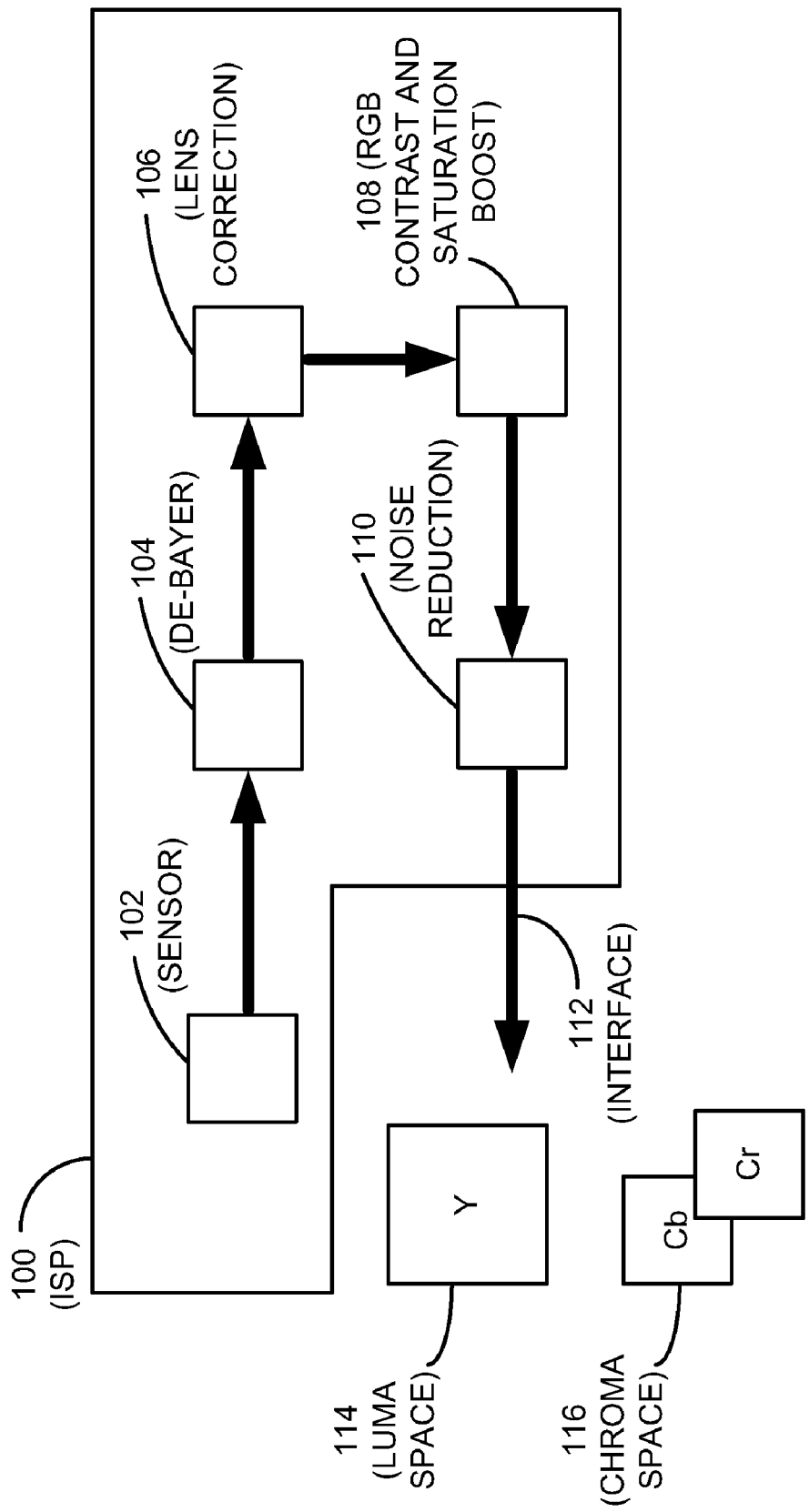
FIG. 1 illustrates a prior art image sensor package, in accordance with one embodiment.

This disclosure pertains to an apparatus, method, computer useable medium, and processor programmed to automatically generate tone mapping curves in a digital camera or digital video camera based on image metadata in order to create more visually appealing images. While this disclosure discusses a new technique for automatically generating tone mapping curves in a digital camera or digital video camera based on image metadata, e.g., image histogram metadata, one of ordinary skill in the art would recognize that the techniques disclosed may also be applied to other contexts and applications as well.

In some embodiments, performing tone-mapping in the camera's image sensor package (ISP) is computationally "free," that is, the data that is to be mapped through the use of tone mapping curves already gets mapped through a table to perform gamma correction. Thus, loading a different table which combines gamma correction and tone curve mapping has essentially no additional performance cost. Color histogram information or brightness histogram information, or any number of other potential image processing parameters are available from the camera's image sensor package, thus no additional computationally expensive image analysis is necessary to determine the parameters of the tone curve that is to be used.

The present disclosure provides solutions to various digital camera image processing problems. For example, selecting tone curves based on image color or brightness histogram data avoids the problem of needing one tone mapping curve that fits all scenes. Further, independently varying the slopes at the endpoints of the tone mapping curves allows the image to present high-light and low-light scenes more pleasingly. Finally, because no user input is required to make this choice, there is no need to implement a user interface to select the type of scene the camera is looking at.

For cameras in embedded devices, e.g., digital cameras, digital video cameras, mobile phones, personal data assistants (PDAs), portable music players, and desktop/laptop/tablet computers, to produce more visually pleasing images, techniques such as those disclosed herein can improve image quality without incurring significant computational overhead or power costs. In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking for those of ordinary skill having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Referring now to FIG. 1, a block diagram of one embodiment of a prior art ISP 100 is shown. The ISP 100 may include a digital image sensor 102, such as a CCD or CMOS sensor. Digital image sensor 102 may send its image information to a demosaicing or de-Bayering process element 104, as is well known in the art. Next, the ISP may perform lens correction 106 to correct the image for various lens distortions, including vignetting artifacts, i.e., light fall-off towards the edges of the frame, and color uniformity. The image data may then be sent to an RGB contrast and saturation boost process 108 before being passed through noise reduction filter 110 to correct for "noise" pixels. Increased noise in pixels is typically caused by the random arrival times of visible light photons to the sensor photosites, but may also be caused by the process of reading the pixel values from the sensor photosites, or for any number of other reasons, and is usually made worse by low light conditions. Finally, the image data may be encoded into the YCbCr family of color spaces and passed over interface 112 for any further processing and/or display by the digital camera. In YCbCr color space, the Y 114 stands for the luminance signal, i.e. brightness, the Cb stands for the "blue difference" chroma component, i.e. B—Y, and the Cr stands for the "red difference" chroma component, i.e., R—Y. The Cb and Cr values together are known as the "chroma space" 116.

Figure 2:
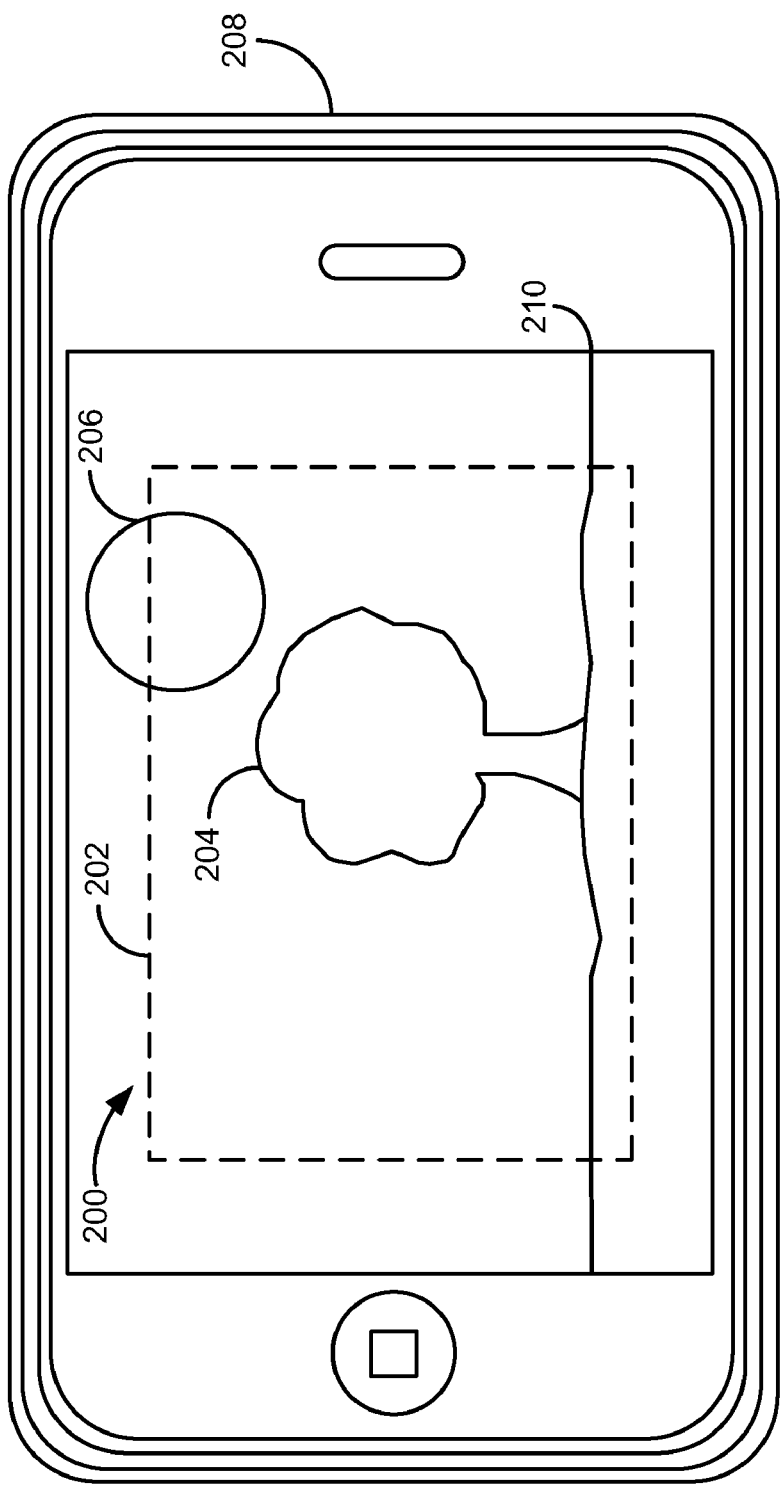
FIG. 2 illustrates a typical exposure metering region for an outdoor scene, in accordance with one embodiment.

Referring now to FIG. 2, a typical histogram sampling region 202 for an outdoor scene 200 is illustrated, in accordance with one embodiment. In this embodiment, the histogram sampling region 202 has dimensions that are 75% of the corresponding dimensions of camera device 208's preview screen 210. That is, histogram sampling region 202's width is 75% of the width of camera device 208's preview screen 210 and histogram sampling region 202's height is 75% of the height of camera device 208's preview screen 210. The 75% dimension choice is not strictly necessary, but it has been empirically determined that choosing a histogram sampling region 202 of this size can help the image's histogram data from being overly influenced by light sources located at the periphery of the frame, e.g., overhead lights at the top of an image.

Figure 3:
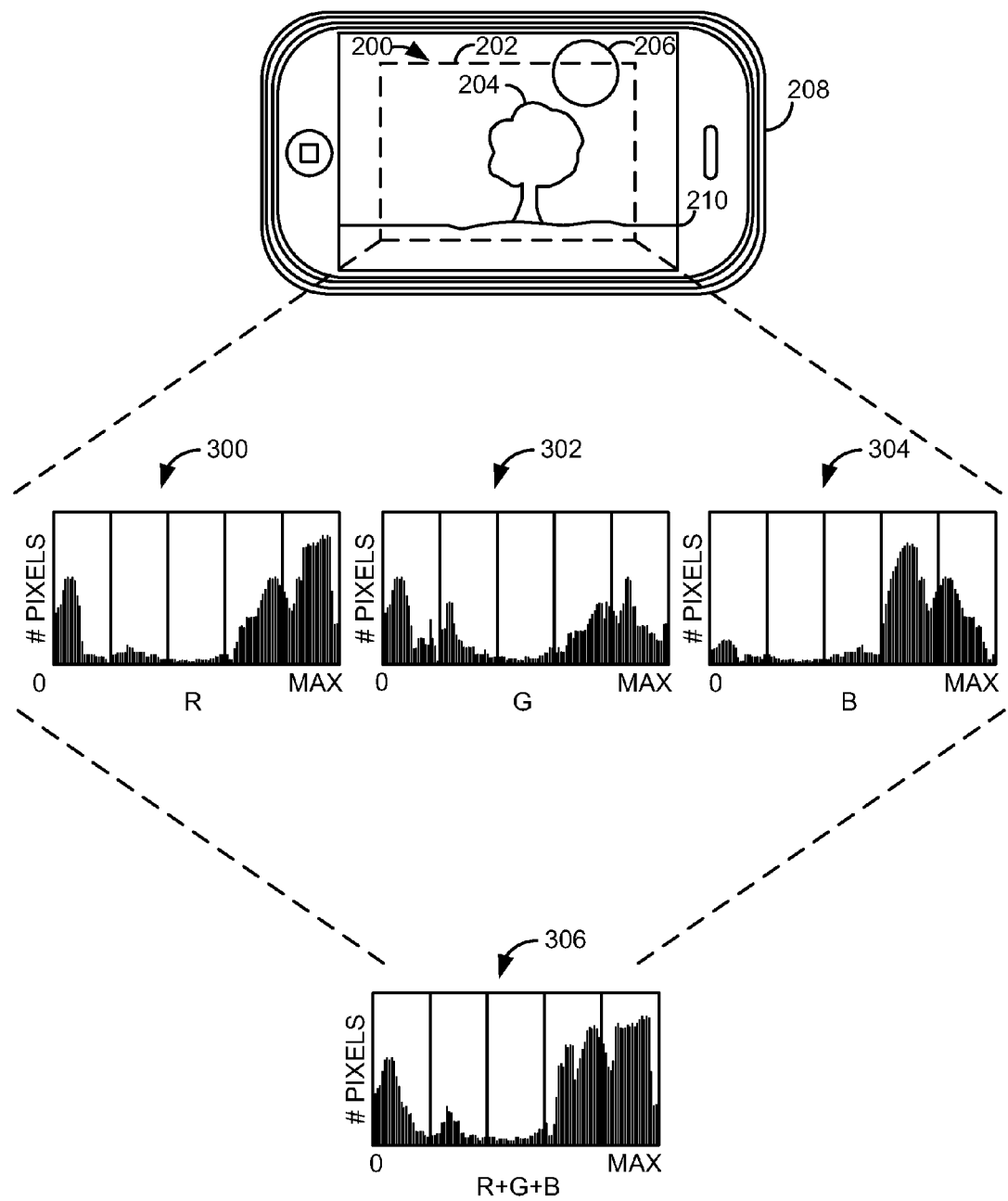
FIG. 3 illustrates various image color histograms for an outdoor scene, in accordance with one embodiment.

Referring now to FIG. 3, various exemplary image histograms (300/302/304/306) for an outdoor scene 200 are illustrated, in accordance with one embodiment. Image histograms may be used to show the brightness or individual color channel dynamic range of the captured image. As is understood in the art, most camera sensors are capable of producing brightness histograms (e.g., brightness histogram 306) representing the combined color channel histograms for each captured image. Some cameras are also capable of producing separate RGB color histograms (e.g., color histograms 300/302/304) for each captured image. RGB color histograms 300/302/304 show the dynamic range for each of the three color channels for pixels located within histogram sampling region 202. The x-axes of the histograms 300/302/304/306 represent intensity value "buckets" ranging from 0 (i.e., black) to the maximum intensity value (i.e., white). For example, with 8-bit intensity values, the maximum intensity value assigned to a pixel would be $2^8-1$, or 255. The y-axes of the histograms 300/302/304/306 represent the number of pixels from within histogram sampling region 202 having a given intensity value, i.e., the number of pixels in any given intensity value "bucket." In applications where it is not important to separate out the various color channels, it is possible to sum the channel intensity information, resulting in single, combined brightness histogram 306, labeled with "R+G+B" along its x-axis.

Analysis of the statistical properties of an image histogram such as brightness histogram 306 has been found by the Applicant to be beneficial in determining parameters to be used in defining automatic tone mapping curves. It has also been found beneficial to adjust the dynamic range of such an image histogram prior to the determination of such automatic tone mapping parameters. In one embodiment, the image histogram is adjusted via setting a certain percentage of the darkest pixels, i.e., those darker than some predetermined "low endpoint" on the intensity x-axis, to the minimum intensity value, and setting a certain percentage of the brightest pixels, i.e., those brighter than some predetermined "high endpoint" on the intensity x-axis, to the maximum intensity value. This type of image histogram adjustment serves to ensure that distribution determinations for the histogram are not overly skewed by a small percentage of pixels within the histogram sampling region having the highest and lowest intensities. Without performing this type of image histogram adjustment or another similar image histogram adjustment process, there is a risk of returning unstable results due to, e.g., noise in the low intensity regions, i.e., shadows, and/or "stuck pixels" on the image sensor.

Figure 4:
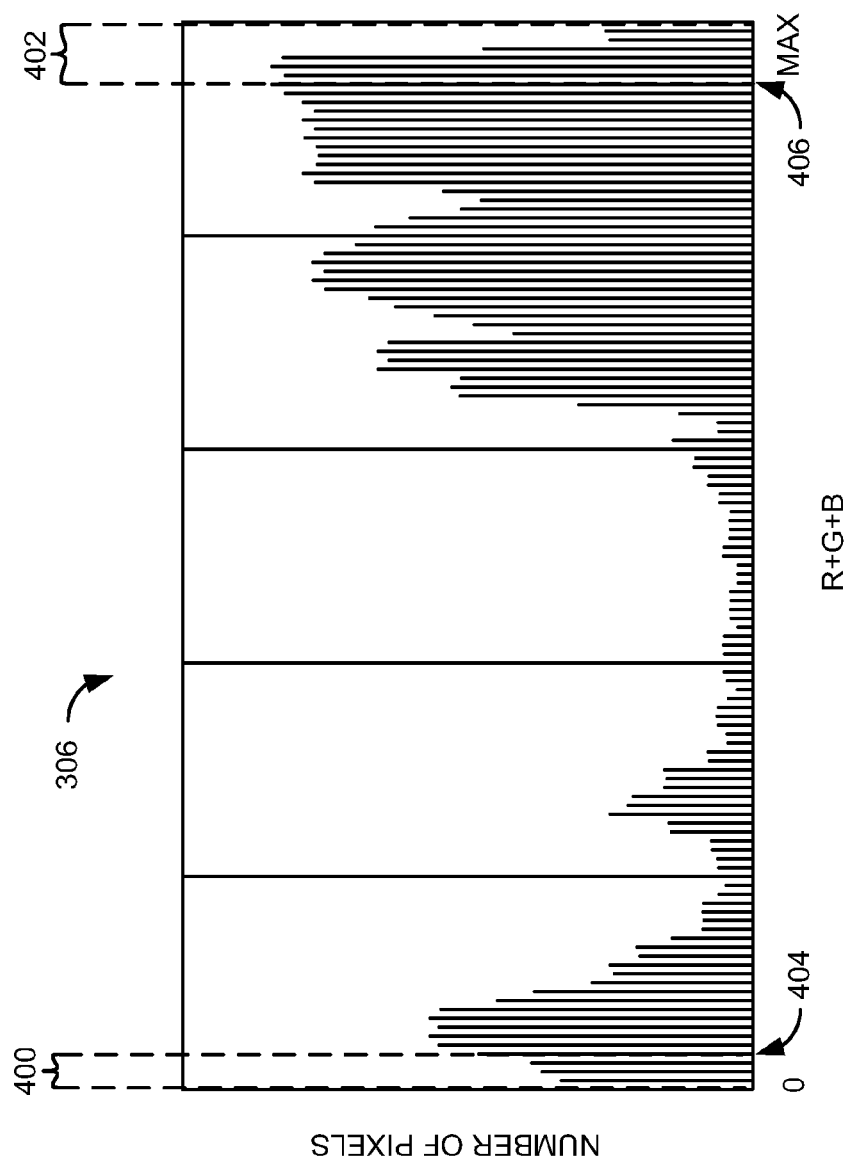
FIG. 4 illustrates the low endpoint region and high endpoint region of a combined image brightness histogram, in accordance with one embodiment.

Referring now to FIG. 4, the low endpoint region 400 and high endpoint region 402 of an exemplary combined image brightness histogram 306 are illustrated, in accordance with one embodiment. In FIG. 4, low endpoint region 400 represents those pixels within histogram sampling region 202 that are darker than some predetermined "low endpoint" value 404 on the intensity x-axis. In one embodiment, it has been determined that the bottom 0.1% of pixels by intensity value within histogram sampling region 202 should be classified as being within low endpoint region 400. Other embodiments may choose to place a larger or small number of pixels within the low endpoint region 400. Should the low endpoint region, e.g., the least intense 0.1% of pixels, fall in between two intensity "buckets," the intensity value 404 at which the low endpoint region begins may simply be calculated by linearly interpolating between the values of two intensity "buckets" based on how many pixels from each bucket fall into the low endpoint region 400. Likewise, in FIG. 4, high endpoint region 402 represents those pixels within histogram sampling region 202 that are brighter than some predetermined "high endpoint" value 406 on the intensity x-axis. In one embodiment, it has been determined that the top 1% of pixels by intensity value within histogram sampling region 202 should be classified as being within high endpoint region 402. Again, other embodiments may choose to place a larger or small number of pixels within the high endpoint region 402.

Further refinements to the determination of low endpoint region 400 and high endpoint region 402 may also be implemented. For example, in one embodiment, it has been determined that there should be a maximum value for low endpoint value 404 and/or a minimum value for high endpoint value 406. In other embodiments, the maximum value for low endpoint value 404 can be a constant value that is chosen based on the personal electronic device's image sensor characteristics rather than being calculated based on the image histogram's distribution. This may be beneficial in circumstances when, e.g., the image histogram does not have enough resolution in the low intensity ranges to make the calculation of the maximum value for low endpoint value 404 reliable.

In one embodiment, it has been determined that the maximum value for low endpoint value 404 should be eight "stops" darker than the middle, i.e., 18%, gray value. Such a maximum value can be calculated according to the following equation:

$$\text{LOW\_ENDPOINT\_MAX} = (0.18 * 2^{-8} * \text{MAXIMUM\_PIXEL\_INTENSITY}) \quad \text{(Eqn. 1).}$$

Should the low endpoint region 400 (e.g., the bottom 0.1% of pixels by intensity value) fall at a value below the calculated Low Endpoint Max value, all such pixels in low endpoint region 400 may be set to the minimum intensity value, i.e., black. If instead, the low endpoint region 400 (e.g., the bottom 0.1% of pixels by intensity value) falls at a value above the calculated Low Endpoint Max value, only those pixels in low endpoint region 400 with intensity values less than the Low Endpoint Max value may be set to the minimum intensity value, i.e., black.

In another embodiment, it has been determined that the minimum value for high endpoint value 406 should be half a "stop" darker than the maximum intensity value. Such a minimum value can be calculated according to the following equation:

$$\text{HIGH\_ENDPOINT\_MIN} = (2^{-0.5} * \text{MAXIMUM\_PIXEL\_INTENSITY}) \quad \text{(Eqn. 2).}$$

Should the high endpoint region 402 (e.g., the top 1% of pixels by intensity value) fall at a value above the calculated High Endpoint Min value, all such pixels in high endpoint region 402 may be set to the maximum intensity value, i.e., white. If instead, the high endpoint region 402 (e.g., the top 1% of pixels by intensity value) falls at a value below the calculated High Endpoint Min value, only those pixels in high endpoint region 402 with intensity values higher than the High Endpoint Min value may be set to the maximum intensity value, i.e., white. The number of stops used in calculating the High Endpoint Min and Low Endpoint Max above are not strictly necessary, and may be determined empirically based on a given image sensor's characteristics.

Figure 5:
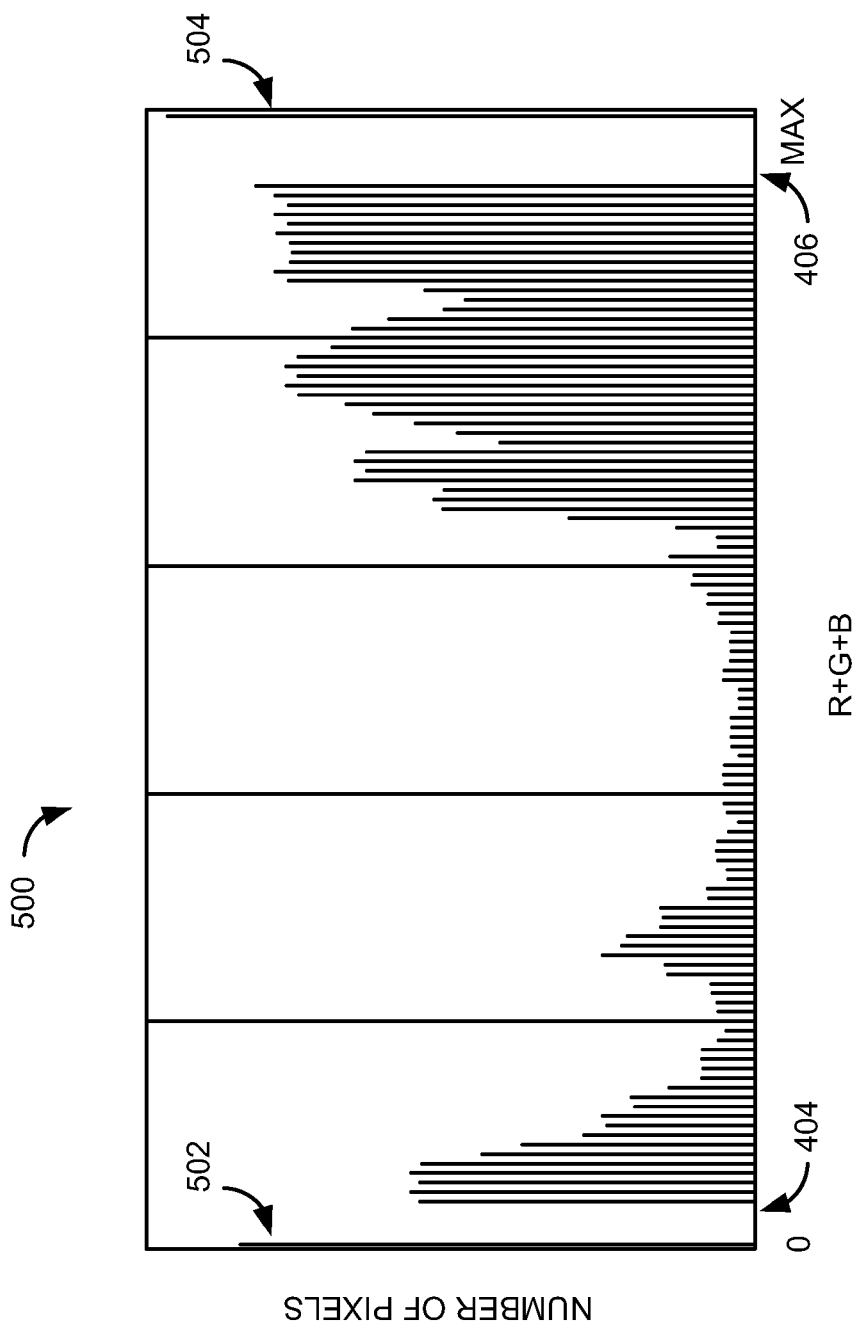
FIG. 5 illustrates an adjusted image brightness histogram resulting from setting pixels below the low endpoint value to a minimum value and pixels above the high endpoint value to a maximum value, in accordance with one embodiment.

Referring now to FIG. 5, an adjusted image brightness histogram 500 resulting from setting pixels below the low endpoint value 404 to a minimum value and pixels above the high endpoint value 406 to a maximum value is illustrated, in accordance with one embodiment. As is shown in FIG. 5, the intensity "bucket" for the minimum intensity value 502 and the intensity "bucket" for the maximum intensity value 504 now contain a greater number of pixels than is shown in previous image brightness histogram 306. Likewise, there are now "empty buckets" between the minimum intensity value and low endpoint value 404 as well as between high endpoint value 406 and the maximum intensity value.

Figure 6:
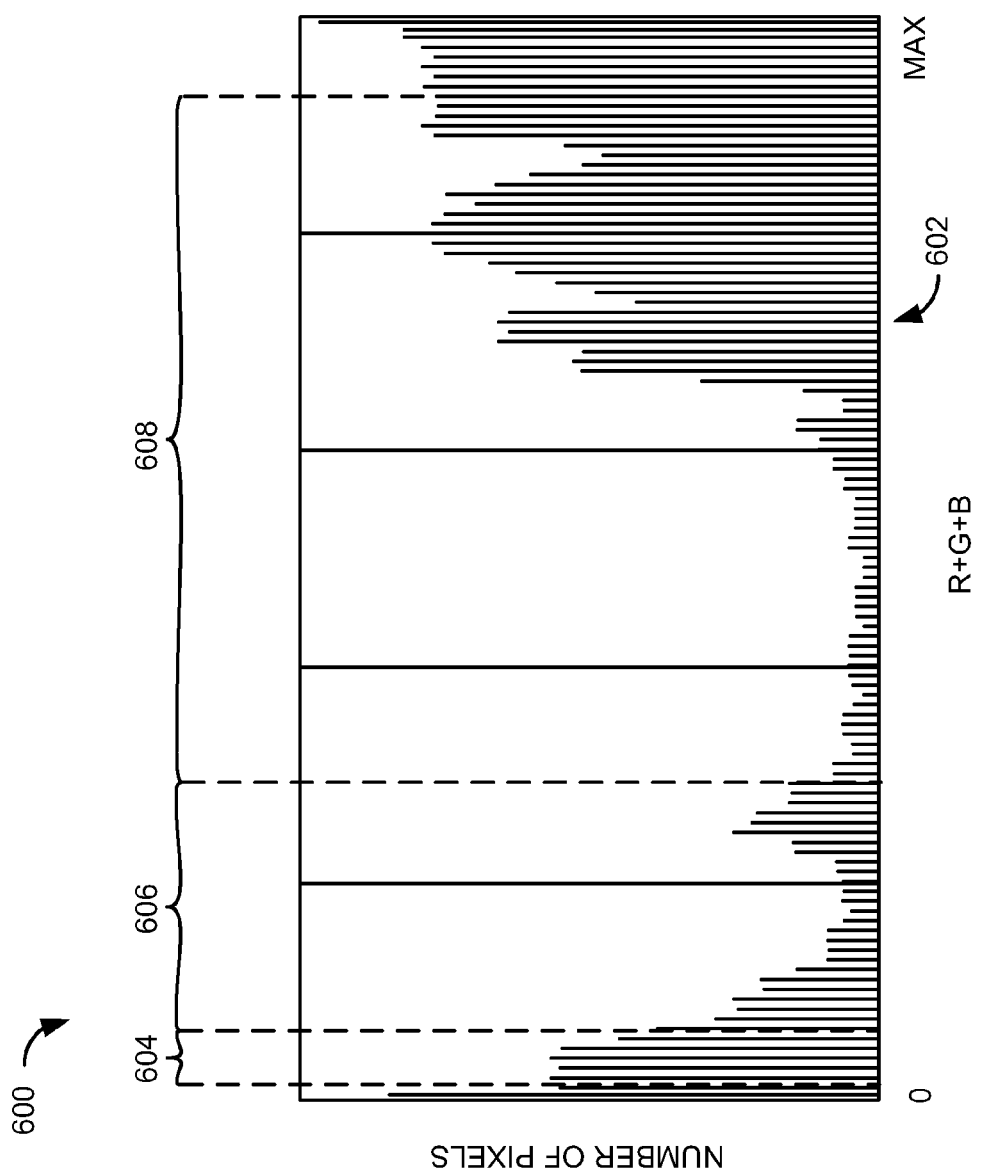
FIG. 6 illustrates an adjusted image brightness histogram resulting from stretching the values of the pixels between the low endpoint value and high endpoint value to encompass the entire range of brightness values, in accordance with one embodiment.

Referring now to FIG. 6, an adjusted image brightness histogram 600 resulting from linearly interpolating, i.e., "stretching," the values of the pixels having intensity values between the low endpoint value 404 and high endpoint value 406 to encompass the entire range of brightness values is illustrated. In accordance with one embodiment, the intensity values of each "non-endpoint region" pixel is "stretched" according to the following equation:

$$INTENSITY_{NEW} = \left( \frac{(INTENSITY_{OLD} - \text{LOW\_ENDPOINT\_VALUE})}{(\text{HIGH\_ENDPOINT\_VALUE} - \text{LOW\_ENDPOINT\_VALUE})} \right), \quad \text{(Eqn. 3)}$$

where the original intensity value of the pixel, Intensity$_{OLD}$, is overwritten by the newly calculated "stretched" value of Intensity$_{NEW}$. Once the image histogram data has been adjusted in the desired manner or manners, e.g., via the setting of endpoint regions (as described in relation to FIGS. 4-5 above) and/or "stretching" the "non-endpoint region" pixels (as described in relation to FIG. 6 above), its distribution can then be statistically analyzed and one or more image processing parameters may be calculated, e.g., the resultant image histogram median point 602, mean, or the number of pixels located in particular regions 604/606/608 of the image histogram. Analysis of the image histogram's distribution may then be used to determine automatic tone mapping parameters, as is described in further detail below. In certain embodiments, one or more distribution values for the image brightness histogram may be characterized by counting the number of pixels located in various ranges within the histogram. For example, one embodiment may calculate the number of pixels located in each of a plurality of regions of the image histogram metadata, e.g., a "Low Region" 604 (defined as being from 4.5 stops below the middle, e.g., 18%, gray value to 1.5 stops below the middle gray value), a "Mid Region" 606 (defined as being from 1.5 stops below the middle gray value to 1.5 stops above the middle gray value), and a "High Region" 608 (defined as being from 1.5 stops above the middle gray value to 4.5 stops above the middle gray value). The number of pixels located in each of the plurality of regions described above may then be used in the calculation of the tone mapping curve parameters, as is described further below in relation to FIG. 7. The number of stops used in calculating the regions described above are not strictly necessary, and the boundaries of the regions may be determined empirically based on, e.g., a given image sensor's characteristics.

Figure 7:
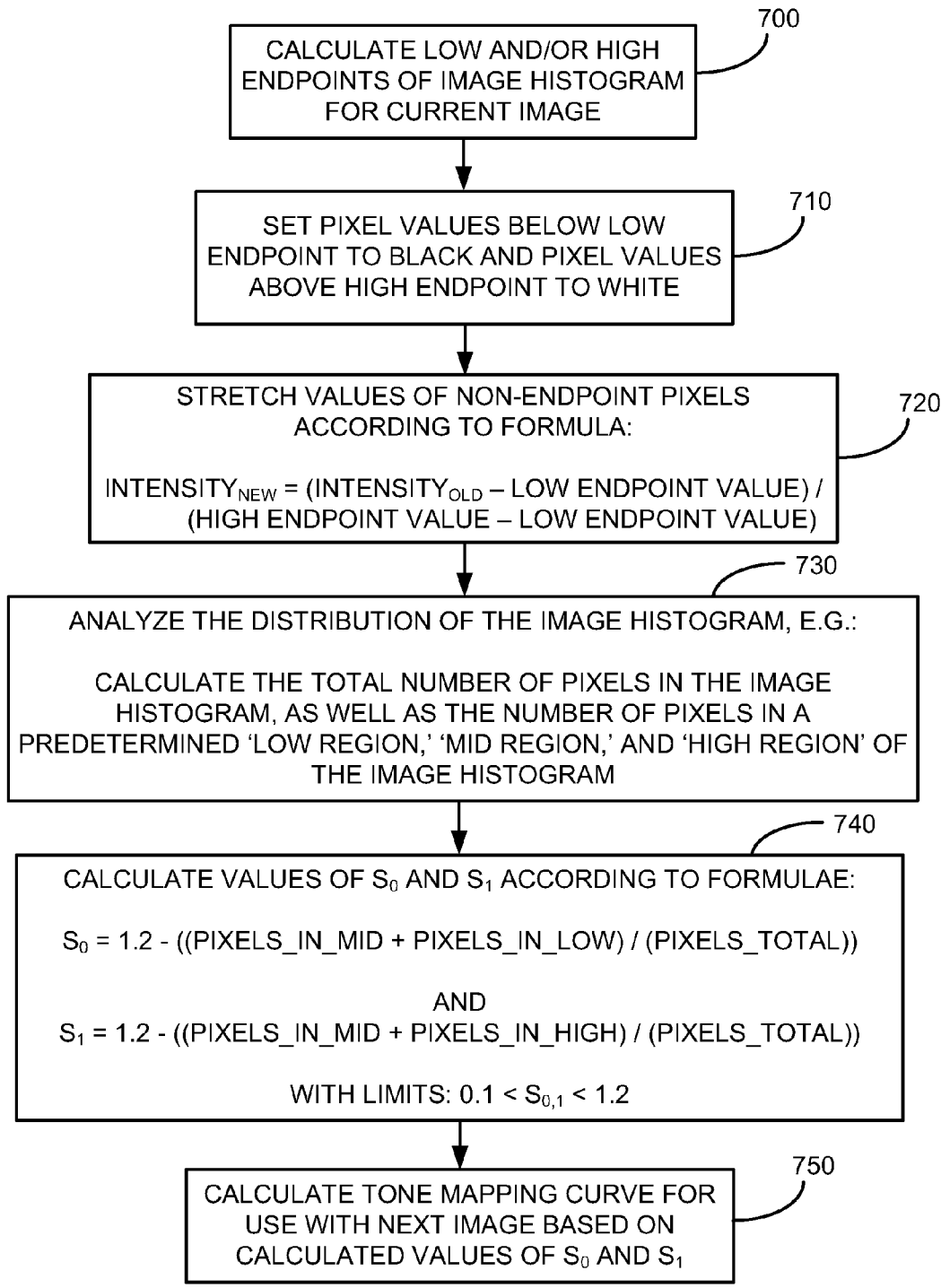
FIG. 7 illustrates, in flowchart form, one embodiment of a process for determining an adjusted image brightness histogram distribution and generating an appropriate tone mapping curve.

Referring now to FIG. 7, one embodiment of a process for determining parameters indicative of the distribution of an adjusted image histogram, e.g., the number of pixels located in each of a plurality of predetermined regions, and generating an appropriate tone mapping curve based at least in part thereupon is illustrated in flowchart form. First, the low endpoint value and/or high endpoint value for the image histogram may be calculated for the current image (Step 700). As discussed above, in some embodiments, it has been found beneficial to set the low endpoint value to be a value below which 0.1% of the pixels in the histogram sampling region fall and to set the high endpoint value to be a value above which 1% of the pixels in the histogram sampling region fall. As also discussed above, the determinations of low endpoint value and/or high endpoint value may also be constrained by predetermined Low Endpoint Max and/or High Endpoint Min values. Next, the pixels falling below the low endpoint value may be set to the minimum intensity value, i.e., black, while the pixels falling above the high endpoint value may be set to the maximum intensity value, i.e., white (Step 710). Next, the "non-endpoint region" pixels may be stretched according to Eqn. 3 above (Step 720). Next, the distribution of the image histogram is analyzed, e.g., by calculating the total number of pixels in the image histogram, as well as the number of pixels in a predetermined "Low Region," "Mid Region," and "High Region," as described above in relation to FIG. 6 (Step 730).

Next, the values of $S_0$ and $S_1$ (recall that $S_0$ and $S_1$ represent the slope of the automatically generated tone mapping curve at the (0,0) point and the (1,1) point, respectively) may be calculated according to Equations 4 and 5:

$$S_0 = a_0 - ((b+c)/(\text{PIXEL\_COUNT})) \quad \text{(Eqn. 4)},$$

$$S_1 = a_1 - ((b+d)/(\text{PIXEL\_COUNT})) \quad \text{(Eqn. 5)}$$

(Step 740). In one embodiment, it has been found to be beneficial to use constants $a_0 = a_1 = 1.2$; where b is the number of pixels in the "Mid Region" of the image histogram as described above in relation to FIG. 6; c is the number of pixels in the "Low Region" of the image histogram as described above in relation to FIG. 6; d is the number of pixels in the "High Region" of the image histogram as described above in relation to FIG. 6; and PIXEL_COUNT is the total number of pixels in the image histogram. Additionally, in one embodiment, it has been found to be beneficial to limit the values of $S_0$ and $S_1$ to an acceptable range, e.g., a minimum value for $S_0$ and $S_1$ of 0.1 and a maximum value for $S_0$ and $S_1$ of 1.2—even if the evaluation of Eqns. 4 and/or 5 produce a value smaller than 0.1 or larger than 1.2. Finally, a tone mapping curve may be calculated for the next image using the newly calculated values of $S_0$ and $S_1$, as will be described in further detail below (Step 750).

Figure 8:
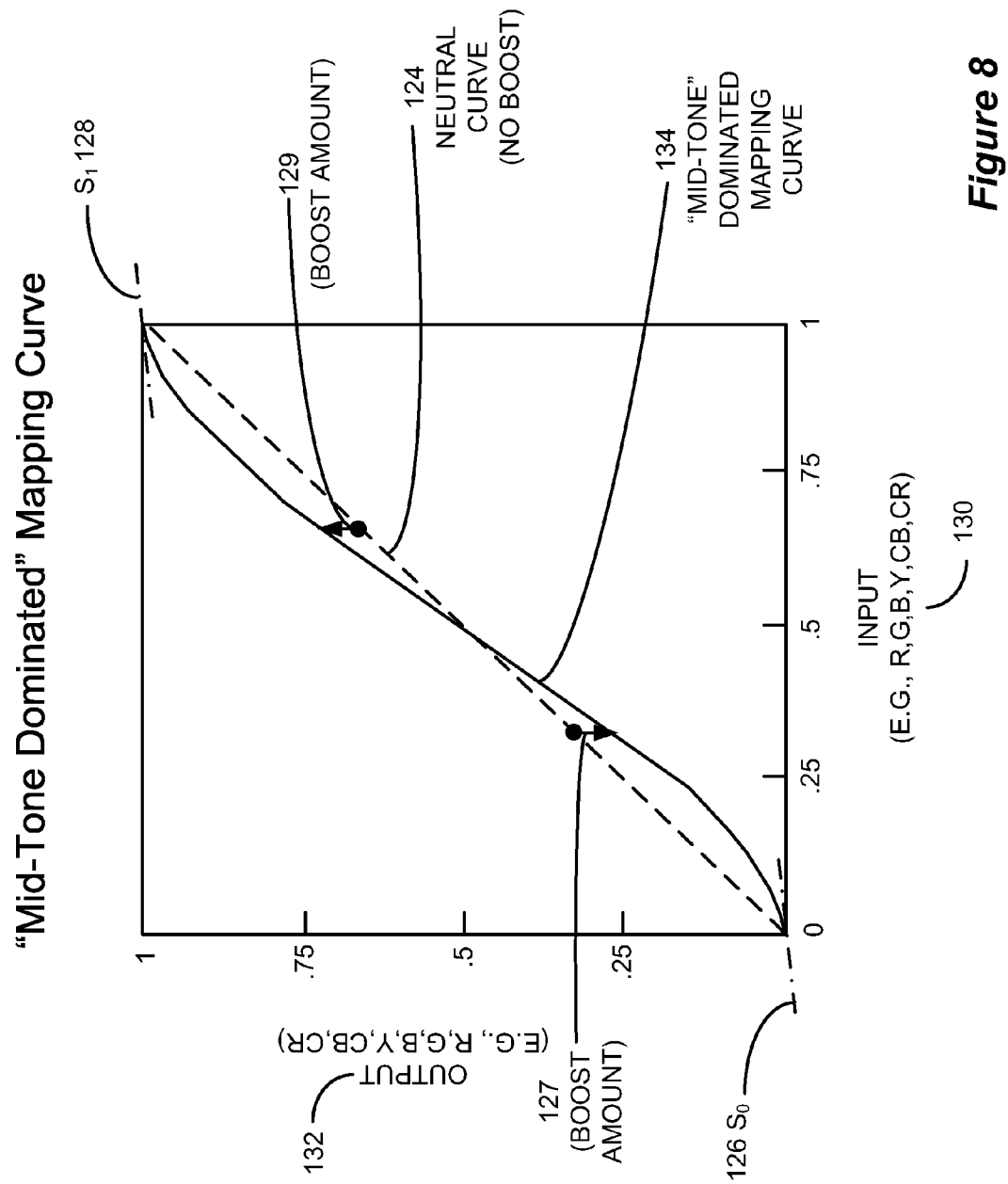
FIG. 8 illustrates a tone mapping curve that produces visually-appealing results in a "mid-tone dominated" scene, in accordance with one embodiment.

Referring now to FIG. 8, a conventional, "mid-tone dominated" tone mapping curve 134 is illustrated. Along the x-axis 130 of the graph is the input value of some component of the input signal (e.g., luminance), normalized to a range of 0 to 1, with 0 representing the darkest pixels (i.e., black) and 1 representing the brightest pixels (i.e., white). Along the y-axis 132 of the graph is the output value of the same component of the input signal (e.g., luminance) that the image data will be mapped to, again normalized to a range of 0 to 1, with 0 representing the darkest pixels and 1 representing the brightest pixels. Applying a tone mapping curve separately to each component of a signal typically causes an increase in contrast and color saturation.

Neutral curve 124 represents a tone curve that would provide no boost to the input image. In other words, neutral curve 124 has a linear slope of 1. For example, pixels with a relative luminance value of 0.25 would stay at 0.25 in the output image; pixels with a relative luminance value of 0.75 would stay at 0.75 in the output image, and so forth for any input luminance value. Neutral curve 124 is shown on the graph to give a reference for how much boosting tone mapping curve 134 provides in the various luminance input regions.

In FIG. 8, the slope of tone mapping curve 134 at the value of zero along the x-axis, $S_0$ 126, is shown to be roughly equal to the slope of tone mapping curve 134 at the value of one along the x-axis, $S_1$ 128, i.e., tone mapping curve 134 is a symmetrical tone mapping curve. The absolute difference between the values of tone mapping curve 134 and neutral curve 124 would be roughly the same for any two pixels equidistant from the midpoint of the tone mapping curve 134. The boosting amounts 127 and 129 are shown at two such pixels that are roughly equidistant from the center of tone mapping curve 134. Notice that the magnitude of both boosting amounts 127 and 129 appear to be substantially equal. In other words, the more shadowy areas of the image and the brighter areas of the image are boosted roughly the same amount, regardless of what light conditions the photo was taken in.

The rationale behind the derivation of Eqns. 4 and 5 is that, if a relatively large number of pixels are located in the "Mid Region" of the image histogram, i.e., the image is "mid-tone dominated," the slope values $S_0$ and $S_1$ are decreased from the starting values of $a_0$ and $a_1$ by roughly the same amounts, thus flattening the sections of the tone mapping curve near the endpoints and causing the tone mapping curve to take on a more pronounced "S-shape." This, in turn, has the effect of increasing contrast in the mid-tones of the image. The boosting amounts 127 and 129 are shown at two pixels that are roughly equidistant from the center of tone mapping curve 134. Notice that, the more the tone mapping curve is flattened at sections near the endpoints, the steeper the slope of the middle section of the tone mapping curve will be, providing even greater contrast in the mid-tones of the image, which is often desirable for an image that is dominated by mid-tone pixels. This has the favorable effect on the photo of not over-boosting the dark or light regions in a mid-tone dominated photo, while simultaneously increasing the amount of contrast in mid-tone range pixel values to bring out those details of the photo.

Figure 9:
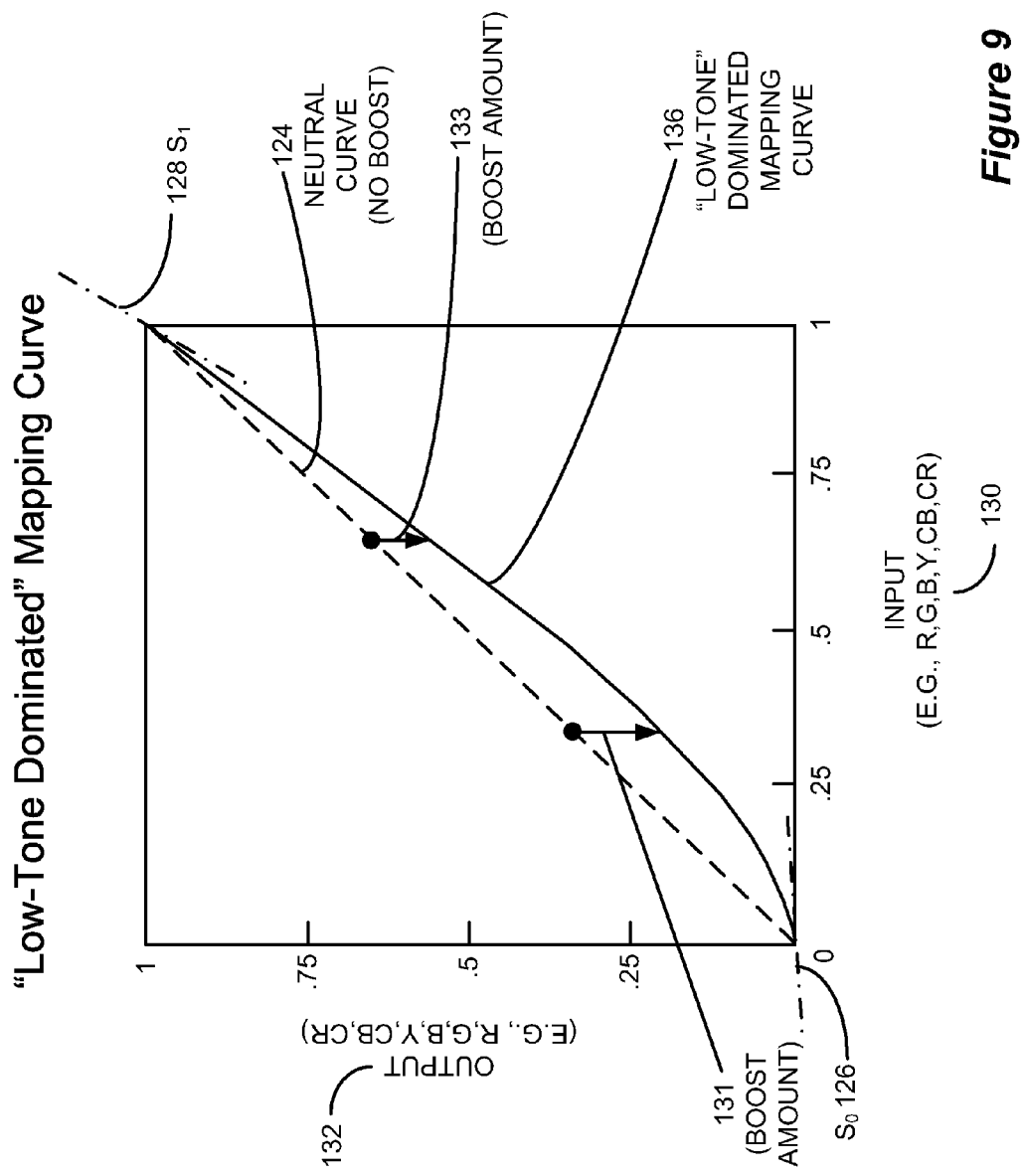
FIG. 9 illustrates a tone mapping curve that produces visually-appealing results in a "low-tone dominated" scene, in accordance with one embodiment.

Referring now to FIG. 9, an exemplary resultant "low-tone dominated" tone mapping curve 136, as taught by the present disclosure, is illustrated. As would be expected, and for the reasons detailed above, for photos that are "low-tone dominated," making $S_0$ smaller and $S_1$ larger to increase contrast in the low tone ranges generally results in more visually appealing images. The boosting amounts 131 and 133 are shown at two pixels that are roughly equidistant from the middle section of tone mapping curve 136. Notice that the magnitudes of boosting amounts provided by tone mapping curve, e.g., boosting amounts 131 and 133, appear to be more pronounced in the low-tone regions of the image, resulting in greater contrast in those areas of the image.

Figure 10:
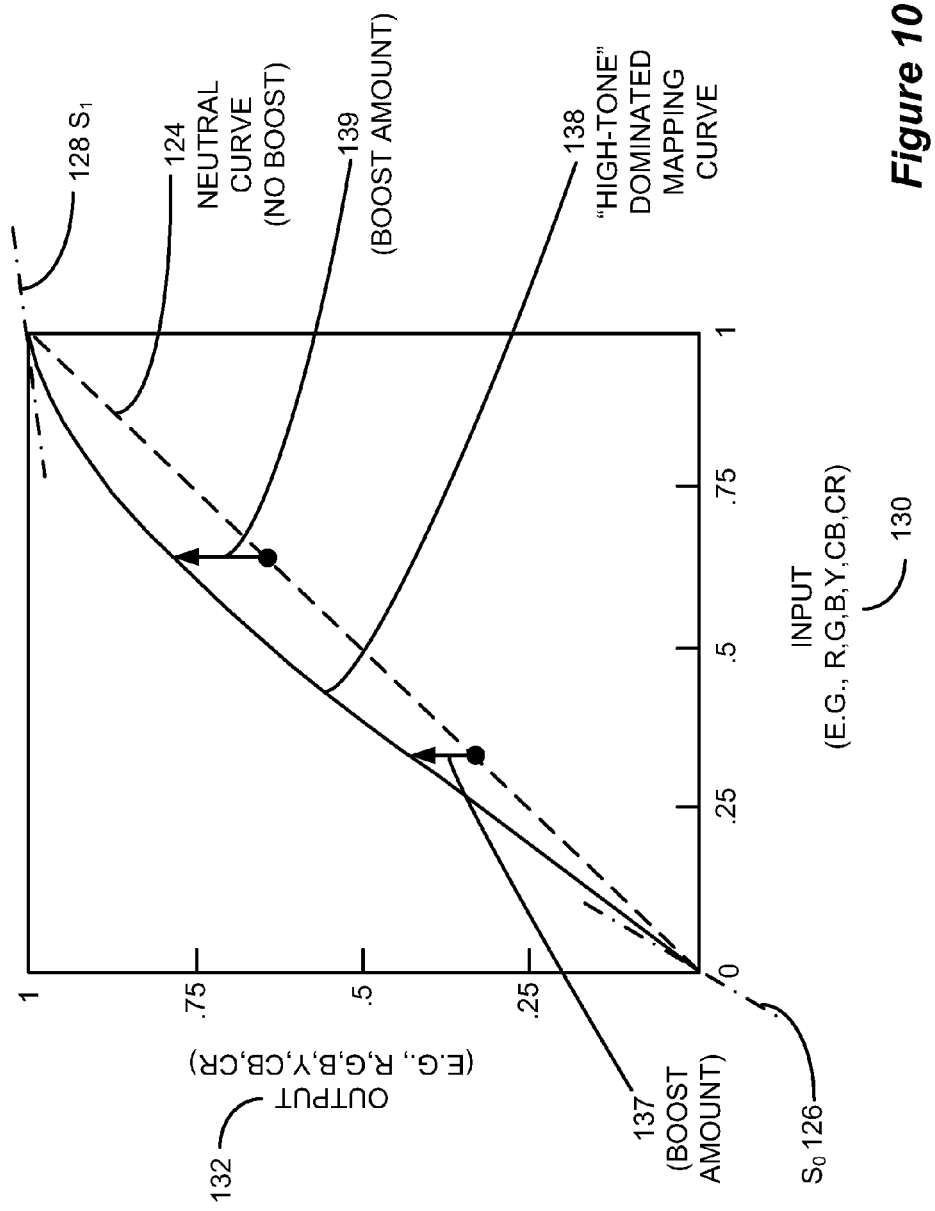
FIG. 10 illustrates a tone mapping curve that produces visually-appealing results in a "high-tone dominated" scene, in accordance with one embodiment.

Referring now to FIG. 10, an exemplary resultant "high-tone dominated" tone mapping curve 138, as taught by the present disclosure, is illustrated. As would be expected, and for the reasons detailed above, for photos that are "high-tone dominated," making $S_0$ larger and $S_1$ smaller to increase contrast in the high tone ranges generally results in more visually appealing images. The boosting amounts 137 and 139 are shown at two pixels that are roughly equidistant from the middle section of tone mapping curve 138. Notice that the magnitudes of boosting amounts provided by tone mapping curve, e.g., boosting amounts 137 and 139, appear to be more pronounced in the high-tone regions of the image, resulting in greater contrast in those areas of the image.

Once the values of $S_0$ and $S_1$ are calculated for a given image (based, for example, at least in part on the distribution of the image's adjusted brightness histogram), the entire tone mapping curve can be determined. In one embodiment, a non-symmetrical tone curve may be used. In another embodiment, a cubic polynomial may be used. A cubic polynomial has four degrees of freedom, that is, four values are needed to completely define a cubic curve. For example, the function:

$$f(x)=Ax^3+Bx^2+Cx+D \qquad \text{(Eqn. 6)}$$

has variable coefficients A, B, C, and D. However, if the tone mapping curve has the form of a cubic polynomial that is "fixed" at two points, i.e., (0,0) and (1,1), there are really only two degrees of freedom to the tone mapping curve. Specifically, the value of D must be zero, and the sum of A+B+C must equal one.

The first derivative of the generic tone mapping polynomial curve of Equation 6 can be represented as:

$$f'(x)=3Ax^2+2Bx+C \qquad \text{(Eqn. 7)}$$

Thus, once the value of the first derivative, that is, the slope, of the curve at points x=0 (i.e., $S_0$) and x=1 (i.e., $S_1$) are known, the rest of the coefficient terms of the polynomial can be solved for. In other embodiments, a function other than a cubic polynomial can be used for the tone mapping curve, for example, a polynomial function of a higher or lower order, or a non-polynomial function, such as a piecewise-defined function. Further, any predetermined range and any set of end points may be used for the function. Once the parameters of the desired tone mapping curve are known, improved ISP 150 can generate a table of values representative of the newly determined tone mapping curve at tone curve generation module 152 (See FIG. 13) and provide this information to the digital camera's improved ISP 150 hardware package that can then use the tone mapping information to simultaneously provide tone curve mapping 154 and gamma boost correction 111 to the data provided by the image sensor. In an alternative embodiment, the application of the tone mapping curve and the gamma boost correction may also be performed separately. The table of generated values may consist of a table with 256 entries, with values going from 0 to 255. The tone curve mapping 154 described above offers a quick and computationally-efficient means for dynamically improving image quality based on light condition without introducing aberrations to the image caused by over-boosting skin tones.

Figure 11:
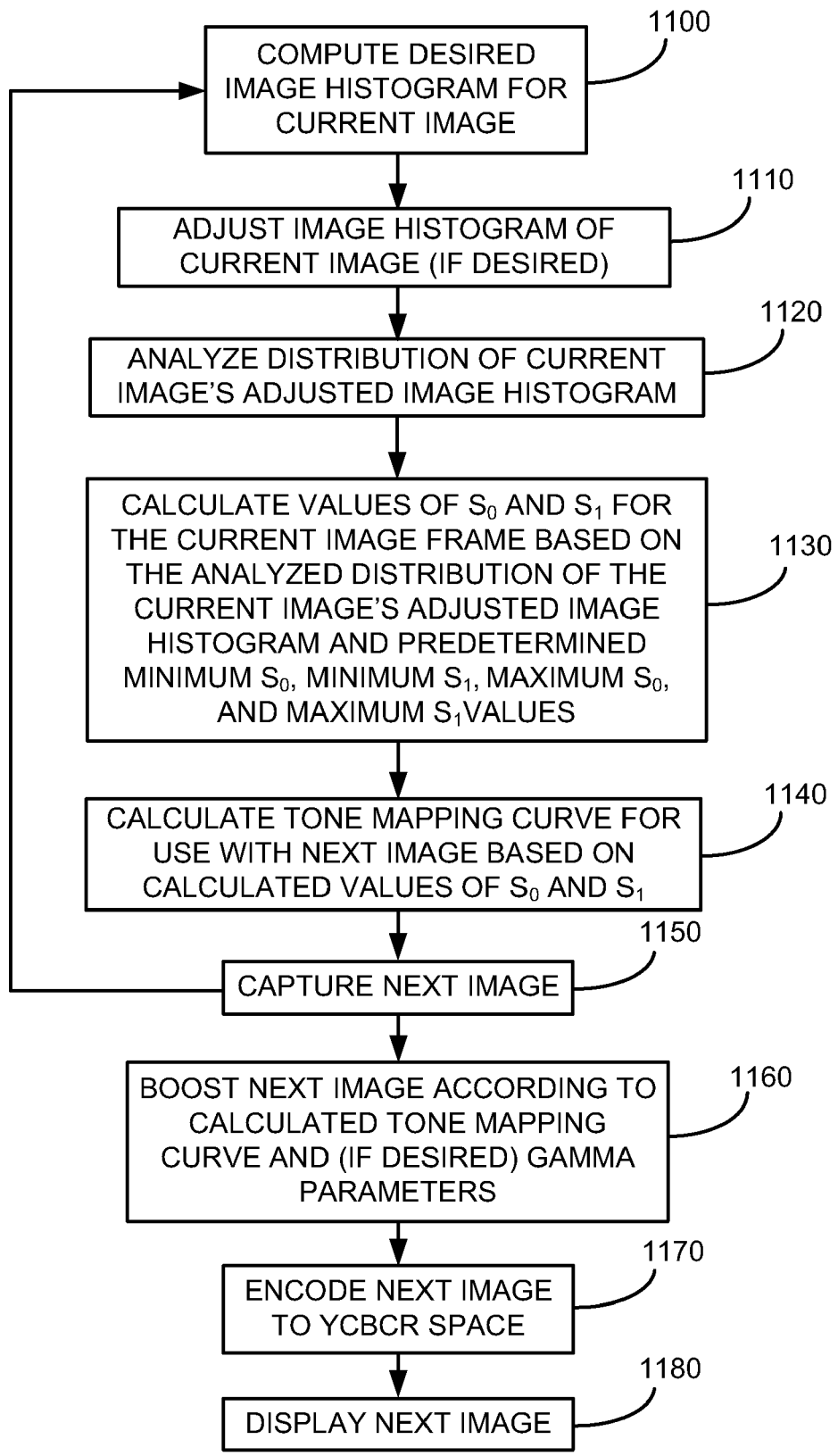
FIG. 11 illustrates, in flowchart form, one embodiment of a process for determining an adjusted image brightness histogram distribution and generating an appropriate tone mapping curve to be applied to a subsequently captured image.

Referring now to FIG. 11, one embodiment of a process for determining an adjusted image brightness histogram distribution and generating an appropriate tone mapping curve to be applied to a subsequently captured image is shown. First, the camera's ISP 150 computes the image histogram for the current image frame, e.g., a brightness histogram, or separate color histograms for each color channel (Step 1100). Next, the image histogram for the current image is adjusted if so desired, e.g., as described above in relation to FIGS. 4-6 (Step 1110). Next, the distribution of the adjusted image histogram is analyzed (Step 1120). Next, the tone curve generation module 152 can calculate the values of $S_0$ and $S_1$ as well as the resultant tone mapping curve coefficients for the current image based on the distribution of the adjusted image histogram as discussed above (Step 1130). Then, a table of values that is representative of the generated tone mapping curve may be generated 152 to be used on the next image (Step 1140). As mentioned above, because the exposure parameters in a typical digital camera or digital video camera are designed to change gradually, the process shown in relation to FIG. 11 may be configured such that the tone mapping curves change gradually as well. In one embodiment, to achieve this gradual changing of the tone curve, the values defining the updated generated tone mapping curve, e.g., the values of $S_0$ and $S_1$, may be updated no more frequently than at a predetermined minimum update interval and may be changed by no more than a predetermined maximum adjustment amount per adjustment. In this way, the process may ensure that there are no sudden (visible) changes in the tone mapping curves. Rather, the adjustments made to the tone mapping curve defining variables may intentionally "lag" behind the current image histogram, e.g., in instances where there is a rapidly changing image histogram.

At this point, the next image may be taken by the camera (Step 1150), and, concurrently, such next image may be boosted according to the generated tone mapping curve (Step 1160) while the ISP 150 returns to Step 1100 to begin the act of calculating a new tone mapping curve based on the next image and to be used on the subsequently taken image. The generated table of representative tone mapping values 152 may be provided to ISP 150's tone curve mapping 154 and combined boosting 111 modules. In these modules, the data from the two tables can be combined and then applied to the image data, i.e., the image can be "boosted" 111 according to the automatically determined tone curve. As an alternative to generating a table of values representative of the generated tone mapping curve, ISP 150 may instead be given the necessary information, i.e., the coefficients, to generate the tone mapping curve data itself. In this alternative embodiment, ISP 150 could then individually calculate the boost amount for each pixel in the image and then pass on the boosted data to combined boost module 111. Finally, the boosted image data may be encoded into the YCbCr color space (Step 1170) and sent out over interface 112 to the device's graphics display hardware 148 for displaying (Step 1180).

Figure 12:
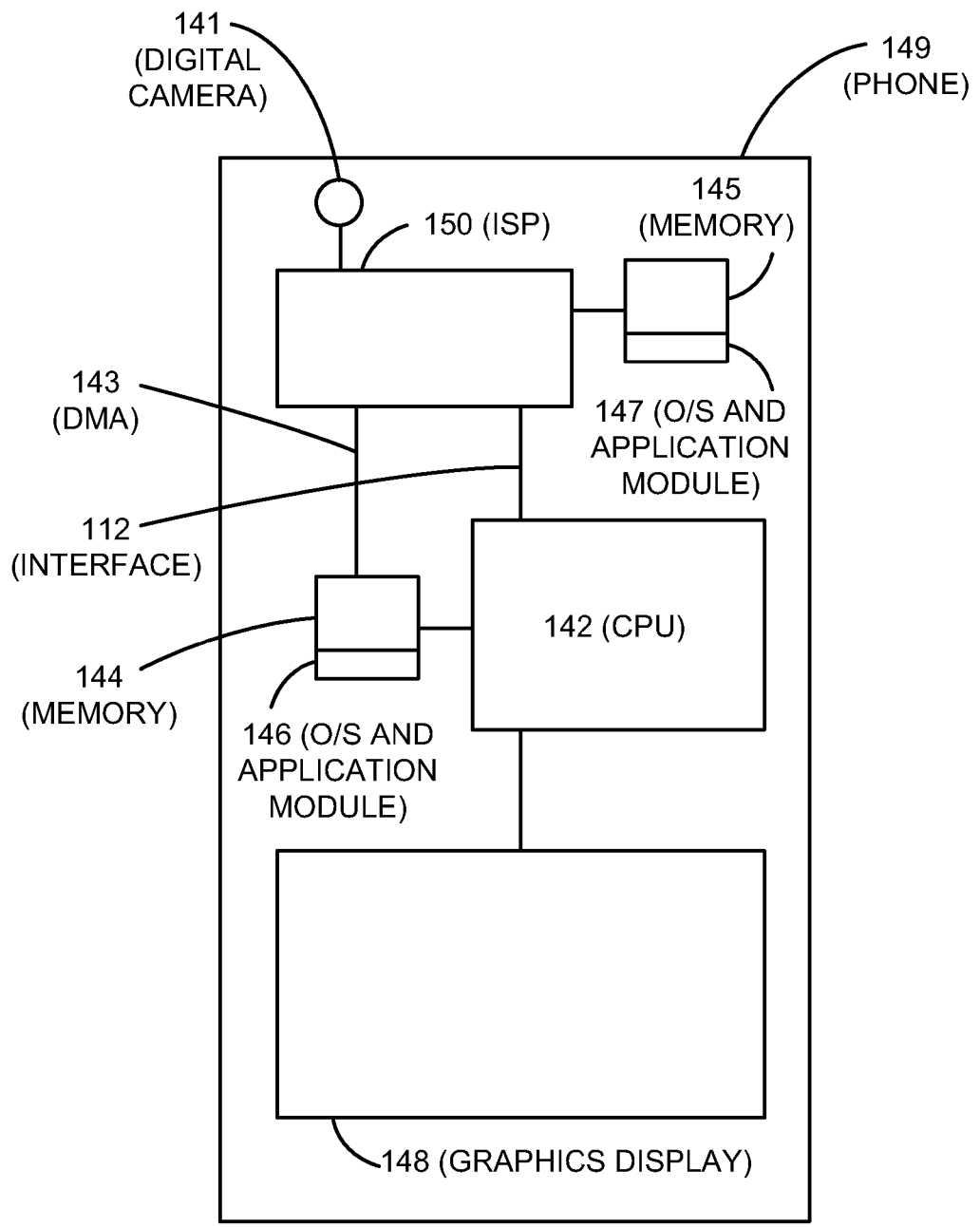
FIG. 12 illustrates one embodiment of an apparatus possessing an improved image sensor package for the determination of brightness histogram distribution information and automatic generation of an appropriate tone mapping curve.

Referring now to FIG. 12, one embodiment of an apparatus possessing an improved image sensor package (ISP) 150 for the determination of image histogram information and automatic generation of an appropriate tone mapping curve is illustrated. In this embodiment, a digital camera comprising a camera sensor unit 141 configured for taking still images or video may be integrated into a multimedia device, such as a mobile phone 149. Improved ISP 150 may communicate with mobile phone 149's central processing unit (CPU) 142 via data interface 112. CPU 142 may communicate with memory unit 144, which, for example, stores the necessary predetermined image processing constants such as the Low Endpoint Min, High Endpoint Max, $a_0$ and $a_1$. In one embodiment, the image data output from ISP 150 is sent to memory unit 144 using direct memory access (DMA) 143. Memory unit 144 is one example of a computer readable medium wherein instructions for carrying out the automatic tone mapping procedure described above may be stored (i.e., tangibly embodied), and it may consist of ROM, EEPROM, Flash memory, or any other suitable type of non-volatile storage medium. Within memory unit 144 may be operating system and application module 146, which provides operating system services and the framework for other applications and services offered by phone 149, e.g., word processing, address book, email, telephone, and photo or video viewing applications. The image data that has been boosted according to the automated tone mapping curves as described above may then be sent out over interface 112 to phone 149's graphic display module 148 so that the image is displayed to the user. Any of the blocks shown in FIG. 12 may potentially be consolidated, even though shown separately in FIG. 12. For example, blocks 144 and 146 may be consolidated with block 142. In other embodiments, the digital camera may be embedded in any of a variety of electronic consumer devices, e.g., digital cameras, digital video cameras, PDAs, portable music players, and desktop/laptop/tablet computers, whose processors may be similarly programmed to perform the automatic tone mapping techniques described herein.

Figure 13:
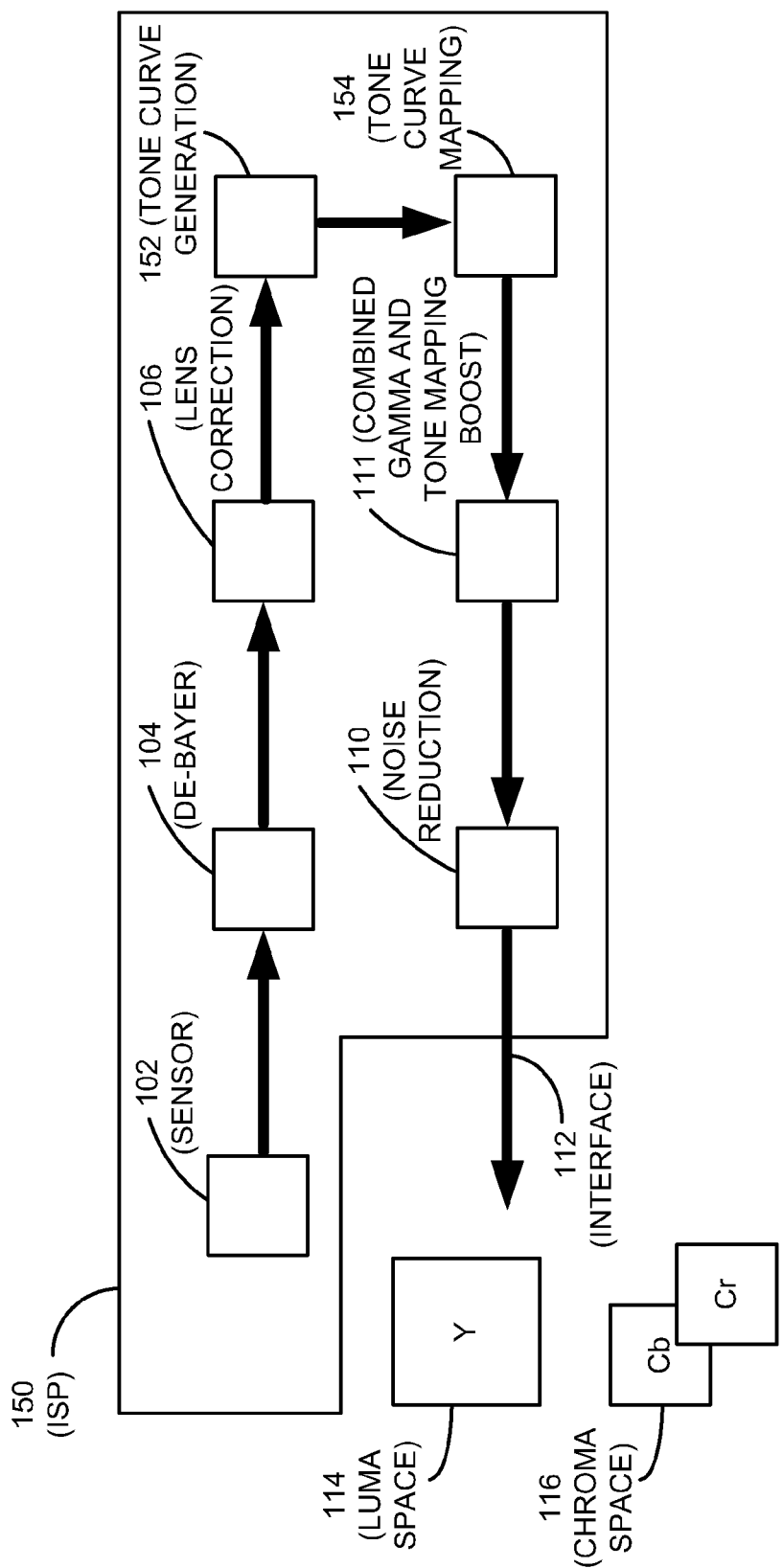
FIG. 13 illustrates an improved image sensor package for automatic tone mapping, in accordance with one embodiment.

Referring to FIG. 13, a block diagram of one embodiment of an improved ISP 150 is illustrated. The ISP 150 may include a digital image sensor 102, a demosaicing or de-Bayering process 104, and a lens correction module 106. The image data may then be sent to tone curve generation module 152 where the adjusted image histogram distribution parameters or other desired image processing parameter(s) indicative of the image histogram are used to calculate the tone curve parameters, and a table of values representative of the appropriate tone mapping curve may be generated 152, as was described above. The tone curve mapping data 154 may then be combined with data representative of the appropriate RGB gamma boost correction curve, and the image may be boosted according to the combined table of values 111. Finally, a noise reduction filter 110 may be applied to the image data. As mentioned above, as an alternative to generating a table of values representative of the generated tone mapping curve, ISP 150 may instead by given the necessary information, e.g., the coefficients, to generate the tone mapping curve data itself. ISP 150 could then individually calculate the boost amount for each pixel in the image and then pass on the boosted data to combined boost module 111. Finally, the image data may be encoded into the YCbCr family of color spaces and passed over interface 112 for any further processing and/or display.

The foregoing description of preferred and other embodiments is not intended to limit or restrict the scope or applicability of the inventive concepts conceived of by the Applicant. As one example, although the present disclosure focused on combined R+G+B brightness histogram information, it will be appreciated that the teachings of the present disclosure can be applied to other implementations wherein the color histograms of the various color channels are treated independently of one another. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A computer processor programmed to perform an image processing method, the method comprising:
    obtaining an image representative of a physical scene and comprising image histogram metadata;
    calculating a first image processing parameter based at least in part on the distribution of the image histogram metadata;
    determining first and second slope values of a tone mapping curve, wherein the first and second slope values are based at least in part on the calculated first image processing parameter, and wherein the first and second slope values are representative of the slope of the tone mapping curve at a first and second endpoint, respectively; and transforming the image according to the tone mapping curve having the first and second slope values.

2. The processor of claim 1, wherein the act of determining the first and second slope values that the processor is programmed to perform further comprises generating a table of values representative of the tone mapping curve between the first and second endpoints.

3. The processor of claim 1, wherein the act of determining the first and second slope values that the processor is programmed to perform is configured to occur no more frequently than at a predetermined minimum update interval.

4. The processor of claim 1, wherein the first image processing parameter comprises the number of pixels in the image that are located in a predetermined region of the image histogram metadata.

5. The processor of claim 1, wherein the act of determining the first and second slope values that the processor is programmed to perform further comprises calculating the number of pixels in the image that are located in each of a plurality of regions of the image histogram metadata.

6. The processor of claim 2, wherein the processor is further programmed to perform the act of combining the generated table of values representative of the tone mapping curve with a second table of values indicative of gamma correction, wherein the act of combining occurs before the act of transforming.

7. The processor of claim 1, wherein the act of obtaining an image representative of a physical scene comprises receiving an image from at least one of the following: a digital camera, digital video camera, mobile phone, personal data assistant, portable music player, and computer.

8. The processor of claim 1, wherein the tone mapping curve comprises a polynomial function.

9. An apparatus, comprising:
a camera sensor unit;
memory operatively coupled to the camera sensor unit for receiving an image representative of a physical scene and comprising image histogram metadata from the camera sensor unit;
a processor unit operatively coupled to the memory, the memory comprising instructions for causing the processor unit to:
calculate a first image processing parameter based at least in part on the distribution of the image histogram metadata;
determine first and second slope values of a tone mapping curve, wherein the first and second slope values are based at least in part on the generated first image processing parameter, and wherein the first and second slope values are representative of the slope of the tone mapping curve at a first and second endpoint, respectively; and
transform the image according to the tone mapping curve having the first and second slope values.

10. The apparatus of claim 9, wherein the act of determining the first and second slope values that the processor is programmed to perform further comprises generating a table of values representative of the tone mapping curve between the first and second endpoints.

11. The apparatus of claim 9, wherein the first image processing parameter comprises the number of pixels in the image that are located in a predetermined region of the image histogram metadata.

12. The apparatus of claim 9, wherein the act of determining the first and second slope values that the processor is programmed to perform further comprises calculating the number of pixels in the image that are located in each of a plurality of regions of the image histogram metadata.

13. The apparatus of claim 10, wherein the processor unit is further programmed to combine the generated table of values representative of the tone mapping curve with a second table of values indicative of gamma correction, wherein the act of combining occurs before the act of transforming.

14. The apparatus of claim 9, wherein the tone mapping curve comprises a polynomial function.

15. The apparatus of claim 9, wherein the act of determining the first and second slope values that the processor is programmed to perform is configured to occur no more frequently than at a predetermined minimum update interval.

16. An image processing method comprising:
obtaining an image representative of a physical scene, the image comprising a plurality of pixel values;
obtaining a histogram for the image, the histogram having a plurality of values;
modifying at least one histogram value;
determining a value representative of the distribution of the modified histogram;
determining first and second slope values based at least in part on the determined value representative of the distribution of the modified histogram;
determining a non-symmetric tone mapping curve having a first endpoint having a slope equal to the first slope value and a second endpoint having a slope equal to the second slope value; and
transforming at least one pixel value in the image according to the non-symmetrical tone mapping curve.

17. The method of claim 16, wherein the act of determining a non-symmetric tone mapping curve further comprises generating a table of values representative of the tone mapping curve between the first and second endpoints.

18. The method of claim 16, wherein the act of determining a value representative of the distribution of the modified histogram further comprises calculating the number of pixel values in the image that are located in each of a plurality of regions of the histogram.

19. The method of claim 17, wherein the method further comprises the act of combining the generated table of values representative of the tone mapping curve with a second table of values indicative of gamma correction, wherein the act of combining occurs before the act of transforming.

20. A computer usable medium having a computer readable program code embodied therein, wherein the computer readable program code is adapted to be executed to implement the method performed by the programmed computer processor of claim 1.

21. A computer processor programmed to perform an image processing method, the method comprising:
obtaining an image representative of a physical scene and comprising image histogram metadata and a plurality of pixels, wherein each pixel has a first value;
adjusting the image histogram metadata by changing the first value of at least one pixel;
calculating a plurality of distribution values for the adjusted image histogram metadata;
determining first and second slope values based at least in part on the calculated plurality of distribution values;
determining a non-symmetric tone mapping curve based at least in part on the calculated slope values, wherein the non-symmetric tone mapping curve has a first endpoint having a slope equal to the first determined slope and a second endpoint having a slope equal to the second determined slope; and transforming the image according to the non-symmetric tone mapping curve.

22. The processor of claim 21, wherein the act of determining the non-symmetric tone mapping curve that the processor is programmed to perform further comprises generating a table of values representative of the tone mapping curve between the first and second endpoints.

23. The processor of claim 21, wherein the act of adjusting the image histogram metadata further comprises:
   changing the first value for all pixels having a first value lower than a predetermined low endpoint value to be equal to a predetermined minimum value; and
   changing the first value for all pixels having a first value higher than a predetermined high endpoint value to be equal to a predetermined maximum value.

24. The processor of claim 21, wherein the act of adjusting the image histogram metadata further comprises:
   changing the first value for all pixels having a first value that is higher than a predetermined low endpoint value and lower than a predetermined high endpoint value,
   wherein the act of changing comprises linearly interpolating the first value between the predetermined low endpoint value and the predetermined high endpoint value.

25. The processor of claim 21, wherein each of the plurality of distribution values is indicative of the number of pixels located in one of a plurality of predetermined regions of the image histogram metadata.

\* \* \* \* \*